United States Patent Office 3,380,959
Patented Apr. 30, 1968

3,380,959
VINYL HALIDE RESINS CONTAINING
OXAZOLINE HEAT STABILIZERS
John A. Frump, Terre Haute, Ind., assignor to Commercial Solvents Corporation, New York, N.Y., a corporation of Maryland
No Drawing. Filed July 7, 1966, Ser. No. 563,349
10 Claims. (Cl. 260—45.8)

ABSTRACT OF THE DISCLOSURE

Heat stable vinyl halide resin compositions obtained by polymerizing a vinyl halide monomer, for example, vinyl chloride, or an admixture of a vinyl halide monomer and a monomer copolymerizable therewith in the presence of an oxazoline of the formula

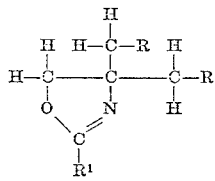

wherein R is a radical selected from the group consisting of lower alkyl having from 1 up to about 3 carbon atoms, hydrogen and

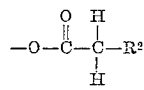

$R^1$ is an alkyl radical having from 1 up to about 25 carbon atoms, and $R^2$ is hydrogen or an alkyl radical having from 1 up to about 25 carbon atoms. Examples of the defined oxazolines are 2-ethyl-4,4-dimethyl-2-oxazoline and 2-ethyl-4,4-bis(propionoyloxymethyl)-2-oxazoline.

---

The present invention relates to heat stabilized vinyl halide resin compositions and to a process for preparing said compositions. In a particular aspect, this invention relates to heat stabilized vinyl halide resin compositions containing as stabilizers an oxazoline of the formula:

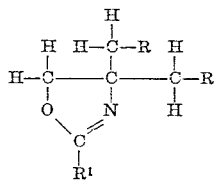

wherein R is a radical selected from the group consisting of lower alkyl having from one to three carbon atoms,

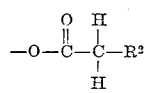

and hydrogen, $R^1$ is an alkyl radical having one up to about twenty-five carbon atoms, and $R^2$ is a radical selected from the group consisting of hydrogen and alkyl having from one up to about twenty-five carbon atoms. In a further aspect, this invention relates to a process for the preparation of heat stabilizing vinyl halide resin compositions by polymerizing in a polymerization medium a vinyl halide monomer and a stabilizing amount of an oxazoline of the formula:

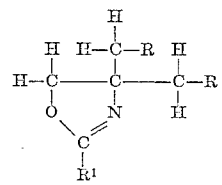

wherein $R^1$ and $R^2$ are defined as above.

As employed herein, the term "vinyl halide resin" is synonomous with the term "vinyl halide polymerization composition" and is meant to include those resins containing a major portion of vinyl halide prepared by the polymerization of vinyl halide or vinyl halide in conjunction with other polymerizable monomers such as vinylidine chloride acrylonitrile, styrene, vinyl esters of aliphatic acids, for example vinyl acetate, alkyl esters of mono-olefinic acids, for example dialkylfumarate and maleate. The vinyl halide concerned with is typically and preferably vinyl chloride although the other halides such as the bromide and the fluoride are also contemplated.

Vinyl halide polymers in general are known to the art and their valuable properties are widely recognized. Vinyl chloride polymers in particular are useful in thermoplastic compositions such as films, bottles, coatings, sheets, tubes, fibers and coverings for wire and cable. Vinyl chloride polymers are particularly useful as coatings for the interior surface of metal cans used in the packaging of beer, malt liquors, carbonated beverages and other foodstuffs since such coatings impart no off odor or flavor to the contents of the can; the coatings provide an inert barrier between the metal of the can and its contents; and the coatings are tough and flexible permitting them to withstand vigorous can-forming and handling operations.

It is well known that vinyl halide polymers are subject to degradation upon heating. Degradation is evidenced by general discoloration of the normally clear, colorless polymer and in extreme cases, by charring and disintegration of the polymer. This lack of thermal stability presents a serious obstacle to the commercial application of vinyl halide polymers since preferred methods of forming articles from vinyl halide polymers typically involve the use of heat. Discoloration is a serious drawback when it is desired to manufacture the polymer into an article of a white or a light pastel color. Currently, it is believed that degradation of vinyl halide polymers is primarily caused by the splitting off of a hydrogen halide, for example hydrogen chloride, from the vinyl halide molecule.

It is also well known that thermal degradation of vinyl halide polymers is increased when certain metals such as iron are present in the polymer system or when the polymer is in contact with such a metal as for example when the polymer serves as a coating for a metal surface such as the interior of a metal can.

It is an object of the present invention to provide heat-stabilized vinyl halide resin compositions.

It is a further object of the present invention to provide heat-stabilized vinyl halide resin compositions which are resistant to degradation when in contact with metals such as iron.

An additional object of the present invention is the provision of a process for the preparation of heat-stabilized vinyl halide resin compositions.

Other objects and advantages of the present invention will be apparent from the specification and appended claims.

The invention is based on the discovery that oxazolines of the formula:

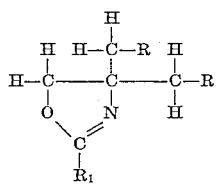

wherein R and R' are defined as above serve as stabilizers for vinyl halide resins. Examples of such oxazolines include 2-ethyl-4,4-dimethyl-2-oxazoline
2-propyl-4,4-dimethyl-2-oxazoline
2-heptadecyl-4,4-dimethyl-2-oxazoline
2-ethyl-4-methyl-4-propionyloxymethyl-2-oxazoline,
2-propyl-4-methyl-4-propionyloxymethyl-2-oxazoline,
2-heptadecyl-4-ethyl-4-propionyloxymethyl-2-oxazoline,
2-heptadecyl-4,4-bis(stearyloxymethyl)-2-oxazoline,
2,4-diethyl-4-propionyloxymethyl-2-oxazoline,
2-ethyl-4,4-bis(propionyloxymethyl)-2-oxazoline, etc.

and the like. The oxazolines used in the present invention are commercially available and may be obtained by the reaction of an amino hydroxy compound and an organic carboxylic acid.

The stabilized vinyl halide resin compositions of the present invention are prepared by effecting the polymerization in a polymerization medium of a vinyl halide monomer or a vinyl halide monomer in admixture with a monomer copolymerizable therewith wherein the vinyl halide monomer comprises a major portion of the admixture in the presence of one or more of the above-defined oxazolines. Methods for the polymerization of vinyl halide monomers are known to the art. Such methods include the well known bulk, solution, emulsion and suspension polymerization techniques. The polymerization is generally conducted at a temperature of from about 30 to about 80° C. for a period of from about 12 to about 48 hours in the presence of a suitable polymerization catalyst. Suitable polymerization catalyst are well known to the art and include lauroylperoxide, benzoylperoxide, potassium persulfate, t-butylperoxide, and the like. Amounts of polymerization catalysts in the range of from about 0.05 to about 0.5% by weight based on the weight of polymerizable material in the polymerization medium are typically employed.

The amount of oxazoline used in the preparation of the compositions of the present invention should be sufficient to stabilize the vinyl halide polymer against heat degradation. Generally, amounts of oxazoline of from about 0.5 to about 30% by weight based on the weight of the vinyl halide monomer may be utilized. Preferred amounts are in the range of from about 1 to about 20% by weight.

The compositions of this invention may be formulated with conventional ingredients, such as for example plasticizers such as dioctyl phthalate, isooctanol, 3,5,5-trimethyl hexanol and the like; pigments such as titanium dioxide; fillers and extenders such as calcium carbonate, etc.

The vinyl halide resin compositions provided by the present compositions may be used for those purposes in which vinyl halide polymers are employed. For example, they may be used in the form of films, bottles, coatings, sheets, tubes, fibers and coverings for wire and cable. In particular, the vinyl chloride resin compositions of the present invention are especially useful as coatings for the interior surface of metal cans.

In addition to heat stabilization the vinyl halide resin compositions of the present invention possess other advantages over unmodified vinyl halide resins. Such advantages include internal plasticization, improved pigment wetting properties and improved dye acceptance properties.

The invention will be understood more fully by reference to the following specific examples. It is understood that the examples are presented for purposes of illustration only and are not intended as a limitation of the invention.

Example 1

A. An aqueous emulsion of a vinyl chloride polymerization composition was obtained by heating a polymerization mixture having the following ingredients at 50° C. for 24 hours:

| Ingredients: | Parts by weight |
| --- | --- |
| Vinyl chloride monomer | 24.0 |
| 2-ethyl-4,4-dimethyl-2-oxazoline | 1.25 |
| Emulsifier [1] | 1.2 |
| $K_2S_2O_8$ | 0.76 |
| $Na_2HPO_4$ | 0.37 |
| Water | 86.0 |

[1] 45% aqueous solution of disodium 4-dodecylated oxydibenzene sulfonate.

The resulting aqueous emulsion was coagulated by the addition thereto of acetic acid. The vinyl chloride polymerization composition was then separated from the coagulated emulsion by centrifugation and decantation and the separated polymerization composition was washed first with water and then with methanol. A dry vinyl chloride resin composition was obtained.

To illustrate the thermal stability of vinyl chloride resin compositions containing oxazoline, the following test was conducted: 5 grams of the vinyl chloride polymer composition prepared above was dissolved in 32 ml. of tetrahydrofuran. Films of the polymeric composition were then cast from solution on a series of 4" by 8" polished steel panels. The films were then cured in an oven for 20 minutes at 350° F. Hard, clear films were obtained. No discoloration of the films occurred.

For comparative purposes, the above procedure was repeated in all essential details with the exception that no oxazoline was included as an ingredient in the vinyl chloride polymerization composition. The films obtained from the vinyl chloride polymerization composition were discolored and tended to disintegrate.

The ability of 2-ethyl-4,4-dimethyl-2-oxazoline to stabilize vinyl chloride resin compositions against thermal degradation in the presence of metal is shown by the above comparison.

Example 2

A vinyl chloride resin composition was prepared according to the method of Example 1 from the following ingredients:

| Ingredients: | Parts by weight |
| --- | --- |
| Vinyl chloride monomer | 24.0 |
| 2-ethyl-4-methyl-4-propionyloxymethyl-2-oxazoline | 1.25 |
| Emulsifier [2] | 1.2 |
| $K_2S_2O_8$ | 0.76 |
| $Na_2HPO_4$ | 0.37 |
| Water | 86.0 |

[2] 45% aqueous solution of disodium 4-dodecylated oxydibenzene sulfonate.

Clear, stable films were obtained from the above composition.

Example 3

A vinyl chloride resin composition was prepared according to the method of Example 1 from the following ingredients:

| Ingredients: | Parts by weight |
| --- | --- |
| Vinyl chloride monomer | 24.0 |
| 2,4-diethyl-4-propionyloxymethyl-2-oxazoline | 1.25 |
| Emulsifier [3] | 1.2 |
| $K_2S_2O_8$ | 0.76 |
| $Na_2HPO_4$ | 0.37 |
| Water | 86.0 |

[3] 45% aqueous solution of disodium 4-dodecylated oxydibenzene sulfonate.

Clear, stable films were obtained from the above composition.

Example 4

A vinyl chloride resin composition was prepared according to the method of Example 1 from the following ingredients:

| Ingredients: | Parts by weight |
| --- | --- |
| Vinyl chloride monomer | 24.0 |
| 2-ethyl-4,4-bis(propionyloxymethyl)-2-oxazoline | 1.25 |
| Emulsifier [4] | 1.2 |
| $K_2S_2O_8$ | 0.76 |
| $Na_2HPO_4$ | 0.37 |
| Water | 86.0 |

[4] 45% aqueous solution of disodium 4-dodecylated oxydibenzene sulfonate.

Clear, stable films were obtained from the above composition.

Since many embodiments may be made in this invention and since many changes may be made in the embodiments described, the foregoing is to be interpreted as illustrative only and the invention is defined by the claims appended hereto.

I claim:

1. A vinyl halide resin composition stabilized against heat degradation obtained by polymerizing a member selected from the group consisting of vinyl halide monomer and admixtures of vinyl halide monomer and a monomer copolymerizable therewith, said admixtures containing a major portion of vinyl halide, in a polymerization medium containing from about 0.5 to about 30.0% by weight based on the vinyl halide monomer of an oxazoline of the formula

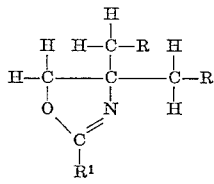

wherein R is a radical selected from the group consisting of lower alkyl having one up to about three carbon atoms, hydrogen and

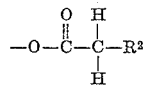

wherein $R^1$ is an alkyl radical having from one up to about 25 carbon atoms, and $R^2$ is a radical selected from the group consisting of hydrogen and alkyl having one up to about 25 carbon atoms.

2. The composition of claim 1 wherein the vinyl halide is vinyl chloride.

3. The composition of claim 2 wherein the amount of oxazoline is in the range of from about 1 to about 20% by weight based on the weight of the vinyl chloride.

4. The composition of claim 2 wherein the oxazoline is 2-ethyl-4,4-dimethyl-2-oxazoline.

5. The composition of claim 2 wherein the oxazoline is 2-ethyl-4-methyl-4-propionyloxymethyl-2-oxazoline.

6. The composition of claim 2 wherein the oxazoline is 2,4-diethyl-4-propionyloxymethyl-2-oxazoline.

7. The composition of claim 2 wherein the oxazoline is 2-ethyl-4,4-bis(propionyloxymethyl)-2-oxazoline.

8. A process for the production of heat stabilized vinyl halide resin compositions which comprises polymerizing a member selected from the group consisting of vinyl halide monomer and admixtures of vinyl halide monomer and admixtures of vinyl halide monomer and a monomer copolymerizable therewith, said admixtures containing a major portion of vinyl halide, in a polymerization medium containing from about 0.5 to about 30% by weight based on the weight of the vinyl halide monomer of an oxazoline of the formula

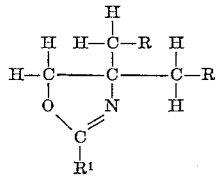

wherein R is a radical selected from the group consisting of lower alkyl having one up to about three carbon atoms, hydrogen and

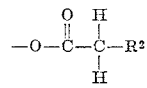

wherein $R^1$ is an alkyl radical having one up to about 25 carbon atoms, and $R^2$ is a radical selected from the group consisting of hydrogen and alkyl having from one up to about 25 carbon atoms.

9. The process of claim 8 wherein the vinyl halide is vinyl chloride.

10. The process of claim 9 wherein the amount of oxazoline is in the range of from about 1 to about 20% by weight based on the weight of the vinyl chloride.

References Cited

UNITED STATES PATENTS

| 2,897,182 | 7/1959 | De Benneville et al. | |
| 3,208,981 | 9/1965 | Miranda et al. | 260—78.5 |
| 3,325,446 | 6/1967 | Chang et al. | 260—45.8 |

DONALD E. CZAJA, *Primary Examiner.*

M. J. WELSH, *Assistant Examiner.*